United States Patent [19]
Farley

[11] Patent Number: 5,197,551
[45] Date of Patent: Mar. 30, 1993

[54] EXTENDED DRAG TOOL FOR A FRONT TINE TILLER

[76] Inventor: John L. Farley, 2908 Messanie St., St. Joseph, Mo. 64501

[21] Appl. No.: 760,882

[22] Filed: Sep. 16, 1991

[51] Int. Cl.$^5$ .................... A01B 33/04; A01B 33/16
[52] U.S. Cl. .................................. 172/42; 172/71; 172/351
[58] Field of Search .................... 172/42, 43, 63, 71, 172/329, 343, 348, 351, 358

[56] References Cited

U.S. PATENT DOCUMENTS

| D. 280,824 | 10/1985 | Mikado | 172/43 X |
|---|---|---|---|
| 2,634,666 | 4/1953 | Merry | 172/42 |
| 2,803,183 | 8/1957 | Smithburn | 172/43 |
| 2,827,842 | 3/1958 | Peterson et al. | 172/42 |
| 3,111,996 | 11/1963 | Ertsgaard | 172/42 |
| 3,132,539 | 5/1964 | Hotz | 172/42 |
| 3,180,428 | 4/1965 | Price | 172/42 |
| 3,502,153 | 3/1970 | Bradshaw et al. | 172/43 |
| 4,015,668 | 4/1977 | Wilson | 172/43 X |
| 4,164,983 | 8/1979 | Hoch | 172/43 |
| 4,591,001 | 5/1986 | Barbee | 172/71 X |

FOREIGN PATENT DOCUMENTS

| 1376520 | 9/1964 | France | 172/42 |
|---|---|---|---|
| 2622861 | 5/1989 | France | 172/42 |

OTHER PUBLICATIONS

Consumer Reports, May 1991, pp. 329-331 "Tillers & Cultivators Machines to Augment the Shovel".

*Primary Examiner*—Randolph A. Reese
*Assistant Examiner*—Jeffrey L. Thompson
*Attorney, Agent, or Firm*—D. A. N. Chase; Michael Yakimo, Jr.; Richard P. Stitt

[57] ABSTRACT

A drag bar having a tiller directing control arm is provided for use with front tine gardening tillers. The control arm presents a user with means upon which to apply directionally controlling forces to a front tine tiller as well as to apply drag forces to control the rate of travel of the tiller.

10 Claims, 2 Drawing Sheets

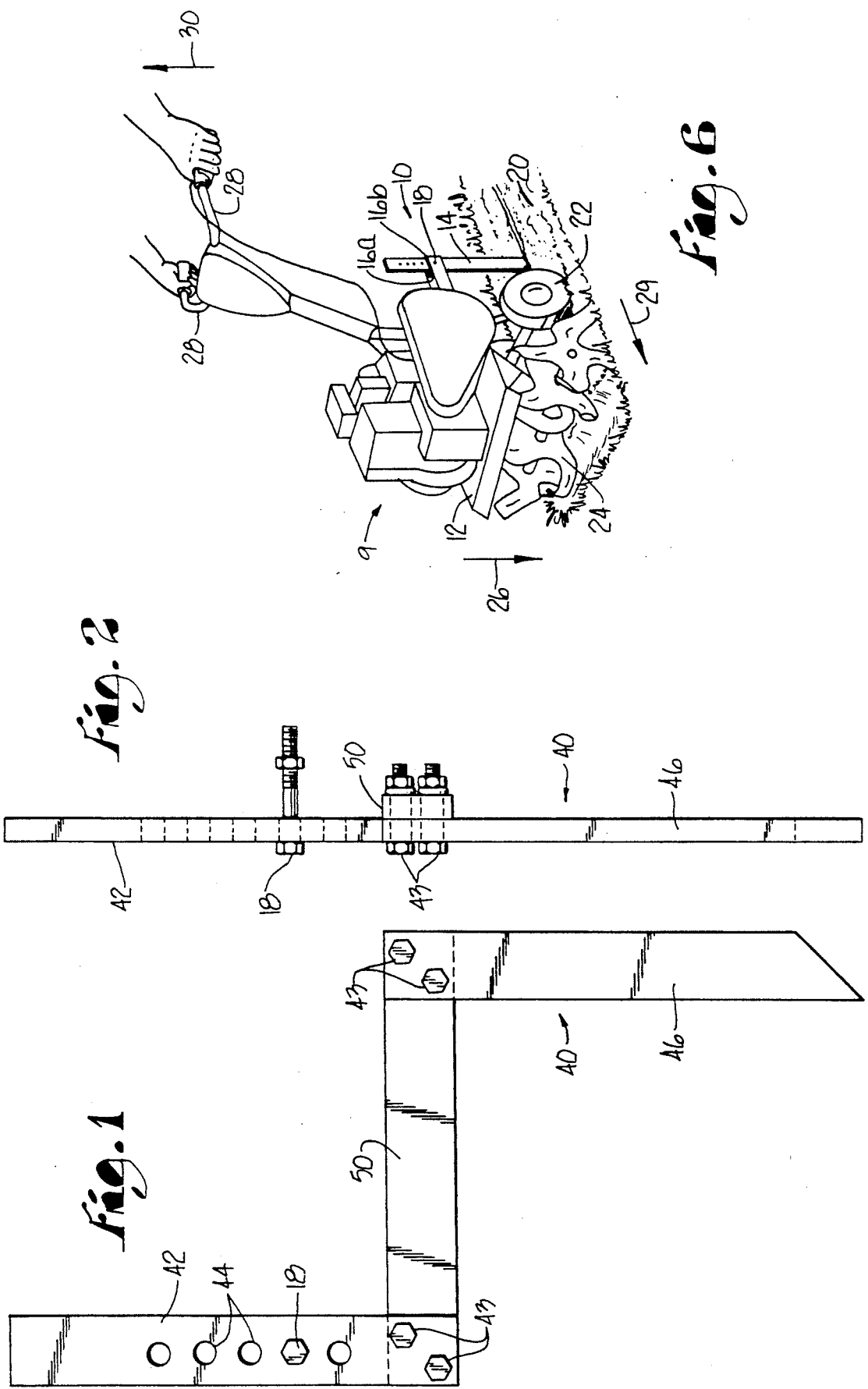

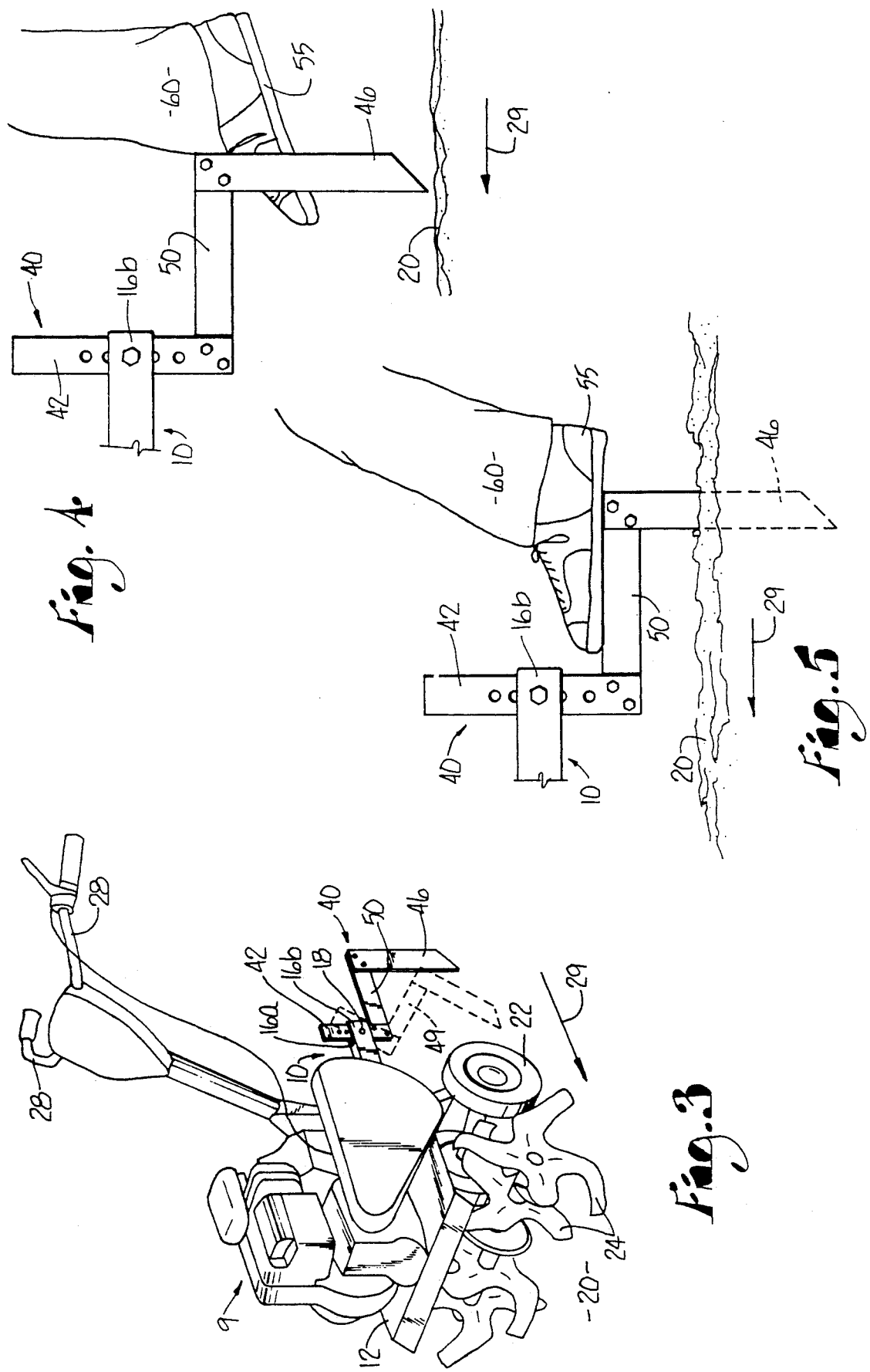

EXTENDED DRAG TOOL FOR A FRONT TINE TILLER

The present invention relates to the field of garden rotatory tillers and more particularly to rotatory tillers having tilling blades mounted in front of the wheels and which are provided with an improved drag bar and directional control.

BACKGROUND OF THE INVENTION

In small plot gardening prior to the 1930s, the only method of tilling or breaking up the soil was to utilize a pick and shovel. In the 1930s, however, the advent of the small engine garden tiller provided a second option for accomplishing the task of small plot tilling and cultivating. Since the 1930s, the garden tiller has changed in size to accommodate the generally smaller garden plots which have evolved since that time. The only major alteration from the original garden tiller design has been movement of the tiller tines from the front of the device, or in front of the wheels of the device, to a position rearward of the wheels. While this modification of moving the tines from a front position to a rear position gained some advantages in control of the garden tiller, it sacrificed the area of safety. In positioning the rapidly rotating tiller tines proximate to the feet of the tiller operator, a substantially greater danger is presented to a user.

This modification of moving the tiller tines from the front to the rear of the tiller—behind the wheels—was in response to a major difficulty presented by front tine tiller devices. This difficulty is the lack of control over tiller movement and rate of travel of the front tine tiller by a user thereof. While operating a rotary tiller is significantly easier than hand spading of a garden plot, nevertheless, substantial effort is required in attempting to control a front tine tiller. As a result of the front positioning of the tiller tines the machine, during operation, evidences a strong tendency to move rapidly along the surface of the ground by "walking" along under the power of the rotating tines. It is, of course, preferred that the machine not move rapidly along the surface of the ground, but rather, move at a slower rate so the rotating tines have an opportunity to dig into the ground and to break up, turn, and loosen the soil of the garden plot.

A second major problem of front tine tillers is the lack of maneuverability of the device. Though the rotating tines move the device in a forward direction along the ground, no portion of the device assists in turning the rotary tiller to the right or to the left other than the force applied by the operator to the handlebars of the device. Various implements have been added to the rotary tiller to assist the user in turning the device and regulating the speed of the device as it moves along the ground.

One such device commonly observed on a rotary tiller is a drag stake mounted behind the wheels of a front tine rotary tiller. The object of the depth stake is to assist in controlling the movement of the rotary tiller by limiting the speed at which the tiller can move in a forward direction over the ground. This is accomplished by the drag stake or drag bar engaging the soil behind the rotary tiller and providing a drag on the entire machine. Also, it is intended that the drag stake be utilized to adjust the distance into the ground which the tiller cultivates. This is accomplished by raising or lowering the depth stake to provide more or less penetration into the ground. When the depth stake or drag bar is extended further into the ground a greater restraint or drag is placed upon movement of the rotary tiller and the tiller spends more time at a single location thus allowing it to dig deeper into the ground.

However, the depth stake itself provides a number of difficulties and limitations in use. When the rotary tiller is initially used on unbroken ground it is difficult to secure the depth stake in the ground to provide the desired drag or resistance. Therefore, the depth stake is of little use until the rotary tiller has cultivated sufficient ground as to bring the depth stake into a tilled area where it may be pushed down into the ground to provide the desired resistance. A second difficulty of the drag stake is that it tends to make poor contact with the ground when the tiller operates on a side-to-side incline. When the user is holding the tiller on a side-to-side incline, such as near the base of large plants or bushes where the soil has been mounded about the plant, the drag stake may inadequately engage or come free of the ground thereby failing in its function.

Most importantly, the conventional depth stake fails to provide any assistance to the user in controlling the direction of travel of the rotary tiller. In attempting to direct the path of movement of the rotary tiller the user has only the two rearward handles to rely on. It is by user application of sheer force to the handles that the substantial weight of the rotary is directed to the right or to the left. In the application of this sideways force to the handles downward pressure may be placed on the handles serving to push the depth stake in further to the ground thus increasing the difficulty of redirecting the path of the rotary tiller.

SUMMARY OF THE INVENTION

Therefore, it is an object of the present invention to provide a control device for a rotary tiller which will slow the forward progress of the rotary tiller over the ground at the desire of the user.

It is another object of the present invention to provide a control device for a rotary tiller which offers the operator additional leverage points for application of force whereby to direct the path of movement of the rotary tiller.

It is another object of the present invention to provide a control device for a rotary tiller which allows selective adjustment of the depth of tilling.

Yet another object of the present invention is to provide an inexpensive control device for a rotary tiller.

Another object of the present invention is to provide a control device for a rotary tiller which may be adapted rapidly and easily to a variety of models of front tine rotary tillers.

A further object of the present invention is to provide a rotary tiller having a drag tool which extends downwardly from a control arm to engage and penetrate the ground whereby a user applied directional force on the control arm changes the degree of engagement of the drag tool with the ground to alter the direction of movement and rate of travel of the tiller.

Other objects and advantages and features of the present invention will appear from reading of the following description in conjunction with the accompanying drawings.

BRIEF DESCRIPTION OF THE DRAWINGS

FIG. 1 is a side elevational view of the control device showing the three functional components thereof;

FIG. 2 is a rear elevational view of the control device;

FIG. 3 is a frontal perspective view of a front tine rotary tiller having the control device attached to a rearward extension of the frame;

FIG. 4 is a side view showing the control device in use and illustrating the application of a directional force thereto by a user;

FIG. 5 is a side view illustrating the device in its drag bar mode of operation and showing the application of downward drag force by a user; and FIG. 6 is a perspective view of a conventional front tine rotary tiller having a standard drag stake attached to a rearward-extending portion of the frame and illustrating with arrows tiller direction of travel, and the upward application of force on the handles of the device by a user to provide a resultant downward force upon the front mounted tines.

DESCRIPTION OF THE PREFERRED EMBODIMENT

Referring first to FIG. 6 wherein a conventional front tine rotary tiller 9 with a conventional straight drag stake 14 is illustrated, the applied forces necessary for operation of the conventional device will be discussed to better illustrate the advantages of the present invention. In the conventional front tine rotary tiller a rearward extending portion 10 of frame 12 is forked at its end so to secure drag stake 14 between the clevis elements 16a, 16b thus presented. As drag stake 14 is mounted between elements 16a, 16b with a single bolt or rod or pin 18, stake 14 is free to pivot to the front and rear. In this standard configuration, it may be observed that tiller 9 contacts ground 20 at wheels 22, drag stake 14 and rotary tines 24. It should be appreciated that the rotating tines 24 contacting ground 20 result in the tiller exhibiting the previously described propensity to "walk" along the ground unless the tiller is restrained. Such restraint provides the opportunity for tines 24 to act on and cultivate a particular area of ground before moving onto a new area. This restraint is accomplished through the use of drag bar 14 which engages with the ground to slow the movement of tiller 9. To press the tines 24 of tiller 9 into ground 20 a downward pressure upon the tines, represented by force arrow 26, must be applied to assist the tines in digging deeper into the ground. Such downward pressure must be applied through a commensurate upward pressure on handles 28 of tiller 9. This upward pressure, represented by force arrow 30, is applied by a user lifting upwardly upon handles 28. This upward lifting, to provide downward pressure 26 on tines 24, is counterproductive to the use of drag stake 14. When upward pressure 30 is applied, drag stake 14 is lifted from the ground and can no longer assist in securing the tiller at a particular location. Therefore, the user must engage in a calculated tradeoff between forcing tines 24 deeper into ground 20 and using body weight and/or pulling rearwardly on handles 28 to assist in preventing tiller 9 from rapid forward "walking" movement along the top of ground 20.

Referring now to FIG. 1 the preferred embodiment of the present invention is shown. Tiller control implement 40 is composed of three components. A support element 42 contains a series of openings 44 through which a bolt or pin or other fastening device 18 (FIG. 2) may be selectively placed to secure implement 40 between elements 16a, 16b of rearward extension 10 of tiller 9 (FIG. 3). Openings 44 in support element 42 allow the distance between rearward extension 10 and drag bar or work tip 46 to be adjusted.

Attached to support element 42 is control arm 50. Control arm 50 extends rearwardly from support element 42 and provides a surface to which a user of tiller 9 can apply directional forces—both side-to-side force as well as up and down force—to assist in controlling the direction of travel and reducing the speed of travel of tiller 9. Control arm 50 is, in the preferred embodiment, bolted to support element 42 and work tip 46 by bolts 43. Control arm 50 may have attached a flat pedal surface for placement of the foot thereon.

In an alternative embodiment the control arm 50, work tip 46 and support element 42 may be welded together or constructed of a single piece of material. It is only necessary that the material be of sufficient strength to withstand the forces applied to it as well as the wear and tear of the ground. In the preferred embodiment control implement 40 is composed of three pieces of straight steel bar stock bolted together. This allows work tip 46 to be changed or renewed and allows alternative support element configurations to be utilized depending on the model of tiller. A more detailed discussion of the application of force to control arm 50 and the results obtained thereby is presented hereinbelow.

A drag tool presenting work tip 46 depends from control arm 50 and is engageable with the ground to provide a drag on tiller 9 and in that respect may be utilized in the manner of a conventional drag stake. The pivotal mounting of support element 42 on rearward extension 10 (FIG. 3), allows work tip 46 to pivot toward wheels 22. This forward pivoting allows tiller 9 to be easily moved in a rearward direction or allows the tiller to be pivoted on wheels 22 without obstruction from work tip 46. This forward pivoted position 49 is shown in FIG. 3.

Referring now to FIG. 3 the attachment of tiller control implement 40 may be observed on the conventional front tine rotary tiller 9. Control implement 40 is secured to the rearward extension 10 of frame 12 between elements 16a, 16b in the same manner as the conventional drag stake 14 in FIG. 6. While control implement 40 could be secured between elements 16a, 16b in a fixed manner, the preferred embodiment utilizes a pivotal mounting means so that the control implement may pivot fore-and-aft in alignment with the line of travel 29 (FIG. 3).

A comparison of FIG. 6 with FIG. 3 indicates the greater distance by which control implement 40 extends rearwardly toward a user than does drag stake 14. This greater rearward extension of control arm 50 places the device at a convenient location for a user, offers a user greater leverage in applying directional controlling forces and allows the user to maintain better balance while using the tiller and applying directional forces.

The application of directional forces to control implement 40 is illustrated in FIG. 4 and FIG. 5. In FIG. 4, control implement 40 is illustrated in a raised position. Control implement 40 may remain in the earth or be removed either fully or partially from the earth during the application of directional forces. As illustrated in FIG. 4, a generally sideways force with respect to direction of travel 2 is applied to work tip 46 of control implement 40 by the foot 55 of a user 60. The application of a sideways force upon work tip 46 or, as is the usual case, against control arm 50 provides additional directional force to alter the path of travel of the rotary tiller.

By way of example, and not limitation, directing the path of travel of rotary tiller 9 (FIG. 3) toward the user's right would be accomplished in the following manner. Pressure, directed across the user's body from the right to the left, would be applied to control arm 50 by the right foot 55 of user 60. Since tiller 9 pivots on wheels 22, this pressure will cause the tiller 9 to make a turn to the user's right.

In a similar manner a turn to the user's left may be accomplished by applying a pressure to control arm 50 using the left foot of a user 60. Pressure would be applied from left to right with respect to the position of the user's body behind tiller 9 while grasping handles 28 (FIG. 3). Pressure applied in this manner by the user's left foot would cause tiller 9 to make a turn to the user's left-hand side. When work tip 46 is removed from the ground, as illustrated in FIG. 4, application of a lesser sideways force will accomplish a turn to the right or the left as in this position only wheels 22 and tines 24 (FIG. 3) are in contact with ground 20.

In FIG. 6 (the prior art) not only are the wheels 22 and tines 24 in contact with the ground, but drag stake 14 also is engaged with the ground. Therefore a user, only by applying pressure to handles 28, must turn a device having not only its wheels on the ground, but a device which is also staked to the ground. While tiller 9 (FIG. 6) will pivot on wheels 22, tines 24 engaging the ground in front of the pivot point and drag stake 14 engaging the ground in back of the pivot point provide substantial impediments to turning tiller 9. Drag stake 14 may be removed from the ground to assist in turning the tiller, but the drag aspect is then lost.

Referring now to FIG. 5, the use of the control implement 40 within the ground will be considered. In making the usual changes of direction while tilling, control implement 40 may remain in the ground while pressure is applied. The application of force to control arm 50 is the same as previously described for FIG. 4 wherein the arm is free from the ground. When work tip 46 is engaged in ground 20, more sideways force is required to make directional changes. However, such force is far less than is required with a conventional drag stake.

In a tiller with the standard drag stake 14 (FIG. 6), the tendency is for drag stake 14 to work its way out of the ground as the tiller moves along the direction of travel 29. Drag stake 14 must then be reestablished in the ground by pushing downwardly on handles 28. Such downward pressure on handles 28 has a resultant effect upon the positioning of tines 24, that being to lift them from the ground 20. This is generally the opposite of the effect that is desired.

This undesirable result is avoided in the present invention through the use of control arm 50. As shown in FIG. 5, the tendency of a drag stake to come out of the ground is countered in the present invention through application of downward pressure to control arm 50 by pressing downwardly with foot 55. This downward pressure is communicated to work tip 46 and reengages the work tip with ground 20.

An additional feature of the present invention is its utility in guiding a rotary tiller along an inclined surface. When working along hillsides or mounds of earth rotary tiller 9 must be operated at an incline from side-to-side. In this instance the weight of the tiller itself produces a sideways force which has a tendency to push the tiller downwardly along the hillside. Through use of the present invention sideways pressure may be applied to counteract this tendency of the rotary tiller to move downhill and thereby maintain the rotary tiller at the proper distance up the hillside.

For example, if the rotary tiller, as shown in FIG. 3, is operating on an incline wherein the operator's right side and tiller's right side are at a higher elevation than the left side of each, the weight of the tiller itself will tend to force the path of travel in a downward direction, i.e. towards the operator's left side. This downward travel may be counteracted by the application of force to control arm 50 in the following manner. Where the tiller is on the previous described incline and tending to slide down the hill to the operator's left, the operator may apply a sideways pressure to control arm 50 with the right foot. The pressure applied would be from the operator's right side against control arm 50 and pressing towards the operator's left-hand side. This pressure, when translated through the pivot point of wheels 22 which contact the ground, will force tines 24 towards the uphill direction or towards the user's right-hand side. In this manner the tendency to slip to the left or down the hill is counteracted by the pressure against control arm 50.

It is hereby understood that while certain forms of this invention have been illustrated and described, it is not limited thereto, except insofar as such limitations are included in the following claims.

Having thus described the invention, what is claimed as new and desired to be secured by Letters Patent is:

1. In a tiller, the combination comprising:
   a frame,
   a ground-engaging wheel means on said frame defining forward and rearward directions of movement of the tiller,
   at least one rotor rotatably mounted on said frame forwardly of said wheel means,
   a plurality of earth tilling tines on said rotor,
   means on said frame for driving said rotor,
   said frame having a rearwardly extending portion,
   a support element depending from said portion,
   means on said portion substantially preventing movement of said support element relative to said frame to the right or the left of said directions of movement,
   a control arm attached to said support element, extending generally rearwardly therefrom and having means for receiving directional forces applied thereto by a user,
   a drag tool extending downwardly from said control arm to engage and penetrate the ground whereby user applied directional force on said control arm changes the angle and depth of engagement of said drag tool with the ground to alter the direction of movement and rate of travel of the tiller.

2. The combination as claimed in claim 1, further comprising means connecting said drag tool at an upper end thereof to said control arm in spaced relationship to said support element.

3. The combination as claimed in claim 2, wherein said support element, control arm and drag tool comprise elongated, interconnected bar members.

4. The combination as claimed in claim 1, further comprising means for adjustably mounting said support element on said frame portion to provide a selectable distance below said portion that said support element extends. drag tool with the ground to alter the direction of movement and rate of travel of the tiller.

5. The combination as claimed in claim 1, further comprising means for pivotally mounting said support element on said frame portion for pivotal movement about a laterally extending axis transverse to said forward and rearward directions.

6. In a tiller having a frame with ground engaging wheels thereon defining forward and rearward directions of movement, and a plurality of earth-tilling rotary tines forward of said wheels, wherein said frame has a rearwardly extending portion, the combination therewith of:

a support element depending from said frame portion, means on said portion substantially preventing movement of said support element relative to said frame to the right or the left of said directions of movement, a control arm attached to said support element, extending generally rearwardly therefrom and having means for receiving directional forces applied thereto by a user, and a drag tool extending downwardly from said control arm to engage and penetrate the ground whereby user applied directional force on said control arm changes the angle and depth of engagement of said drag tool with the ground to alter the direction of movement and rate of travel of the tiller.

7. The combination as claimed in claim 6, further comprising means connecting said drag tool at an upper end thereof to said control arm in spaced relationship to said support element.

8. The combination as claimed in claim 7, wherein said support element, control arm and drag tool comprise elongated, interconnected bar members.

9. The combination as claimed in claim 6, further comprising means for adjustably mounting said support element on said frame portion to provide a selectable distance below said portion that said support element extends.

10. The combination as claimed in claim 6, further comprising means for pivotally mounting said support element on said frame portion for pivotal movement about a laterally extending axis transverse to said forward and rearward directions.

* * * * *

UNITED STATES PATENT AND TRADEMARK OFFICE
CERTIFICATE OF CORRECTION

PATENT NO. : 5,197,551
DATED : March 30, 1993
INVENTOR(S) : John L. Farley

It is certified that error appears in the above—identified patent and that said Letters Patent is hereby corrected as shown below:

Claim 4, column 7, lines 4 and 5, after the word "extends." delete "drag tool with the ground to alter the direction of movement and rate of travel of the tiller."

Signed and Sealed this

Sixteenth Day of November, 1993

Attest:

BRUCE LEHMAN

Attesting Officer    Commissioner of Patents and Trademarks